United States Patent [19]
Dieter et al.

[11] 3,856,720
[45] Dec. 24, 1974

[54] CYCLIC NITRILE ADDUCT-EPOXIDE COMPOSITIONS

[75] Inventors: Jerry A. Dieter, Huntington Woods, Mich.; Donald H. Russell; Richard W. Sauer, both of Cherry Hill, N.J.

[73] Assignee: Atlantic Richfield Company, Los Angeles, Calif.

[22] Filed: Mar. 8, 1973

[21] Appl. No.: 339,239

[52] U.S. Cl. ........ 260/2.5 A, 260/2 BP, 260/77.5 B, 260/77.5 R, 260/468 E, 260/471 C, 260/482 B, 260/830 R, 260/830 P
[51] Int. Cl. ..................... C08g 22/04, C08g 33/02
[58] Field of Search ....... 260/2.5 A, 77.5 B, 77.5 R, 260/830 R, 830 P, 2 BP, 468 E, 471 C, 482 B

[56] References Cited
OTHER PUBLICATIONS

Wyandotte Technical Data Bulletin on Pluracol Pep Polyether Tetrols, Wyandotte Chem. Corp, Aug. 25, 1960.

Primary Examiner—Donald E. Czaja
Assistant Examiner—C. Warren Ivy
Attorney, Agent, or Firm—Coleman R. Reap

[57] ABSTRACT

Coating, elastomer and foam polyurethane type compositions are produced from cyclic nitrile adducts and epoxides or a combination of epoxides with polyols or polythiols having 2 or more hydroxyl or thiol groups per molecule. Adipodinitrile carbonate is a preferred cyclic nitrile.

14 Claims, No Drawings

CYCLIC NITRILE ADDUCT-EPOXIDE COMPOSITIONS

BACKGROUND OF THE INVENTION

This invention relates to polyurethane type compositions useful as coatings, films, adhesives, elastomers, foams and the like produced by the reaction of a cyclic nitrile adduct with an epoxide, alone, or in combination with polyols or polythiols having 2 or more hydroxyl or thiol groups in the molecule. A preferred example of the cyclic nitrile adduct is adipodinitrile carbonate.

PRIOR ART

In U.S. Pat. No. 3,531,425 there is described the production of high molecular weight compositions obtained by reacting cyclic nitrile adducts with polyols and polythiols. This patent describes the preparation of urethane and hydroxamate systems by reacting 1 equivalent of the cyclic nitrile adduct with 1 equivalent of the polyol or polythiol. Equivalents are expressed on the basis that 1 hydroxyl or thiol group reacts with 1 cyclic nitrile group. In co-pending applications similar systems are described wherein the ratio of the cyclic nitrile adduct to the polyol is greater than the 1 to 1 equivalent ratio and includes reactions of the cyclic nitrile with itself.

The instant invention differs from the prior art in that the cyclic nitrile adduct is reacted with an epoxide, including epoxides having a multiplicity of epoxide groups in an additional embodiment the cyclic nitrile adduct is reacted with the epoxide and a polyol or a polythiol.

SUMMARY OF THE INVENTION

In accordance with the instant invention, either low molecular weight cyclic nitrile adducts such as adipodinitrile carbonate can be employed or unsaturated cyclic nitrile adducts can be homopolymerized or copolymerized with polymerizable monomers to produce high molecular weight polycyclic nitrile compounds which in turn can be reacted with mono- or poly-epoxides to produce high molecular weight coating compositions. In another embodiment of the invention either the low or high molecular weight cyclic nitrile adducts are reacted with both an epoxide and a polyol or polythiol to produce high molecular weight coatings, adhesives, foams and the like.

It is an object of this invention, therefore, to produce novel high molecular weight compositions from cyclic nitrile adducts and epoxides.

It is another object of this invention to produce novel high molecular weight compositions by reacting cyclic nitrile adducts with a combination of an epoxide and a polyol or polythiol.

It is another object of this invention to produce novel high molecular weight compositions by reacting di- or polycyclic nitrile compounds with mono-epoxides.

It is another object of this invention to produce novel high molecular weight compositions by reacting di- or polycyclic nitric compounds with diepoxides.

It is a specific object of this invention to produce novel high molecular weight compositions by reacting adipodinitrile carbonate with epoxides.

It is a further specific object of this invention to produce novel high molecular weight compositions by reacting adipodinitrile carbonate with epoxides and polyols.

Other objects of this invention will be apparent from the following description of the invention, from the preferred embodiments and from the claims.

DESCRIPTION OF THE INVENTION

DESCRIPTION OF THE PREFERRED EMBODIMENTS

The novel high molecular weight compositions of this invention are obtained by the reaction of cyclic nitrile adducts with epoxides alone or with mixtures of epoxides and polyols or polythiols. The reaction is carried out in the presence of a catalyst, pigments and fillers (if desired), and a suitable solvent. Depending upon the particular type of composition desired, i.e. coating, film, elastomer, foam, or the like, the reaction techniques can be varied somewhat to provide the desired type of composition as will be described hereinafter. The reactants, catalysts and solvents are set forth in greater detail as follows.

THE CYCLIC NITRILE ADDUCTS

The cyclic nitrile adducts useful in this invention are represented by the structure:

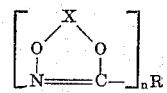

wherein R is an organic radical having from 2 to about 200,000 carbon atoms and is free of nucleophilic groups and can be aliphatic or aromatic including cycloaliphatic, alkaryl or aralkyl radicals. For example, it can be an aliphatic polymeric chain ranging from 2 to about 200,000 carbon atoms or more to which the cyclic nitrile groups are attached. The R may be a hydrocarbon chain or it may be substituted by halogens, nitriles, esters, ethers, carboxylic acid or anhydrides, aldehyes or ketones or combinations of these dependent from the chain. The X is:

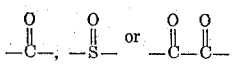

and n ranges from 2 to about 100,000 or more.

The production of the low molecular weight aliphatic and aromatic cyclic nitrile adducts wherein n ranges up to 4 has been described in detail in U.S. Pat. No. 3,351,425, and U.S. Pat. No. 3,652,507, both incorporated herein by reference. A preferred example of these for use in this invention is the adipodinitrile carbonate which has the structure:

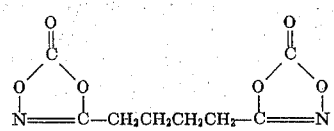

The higher molecular weight adducts, wherein n is 5 or higher, can be prepared by the homopolymerization of the vinyl derivatives of the cyclic nitriles, for example, vinyl nitrile carbonate having the structure:

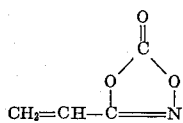

or the above described analogues

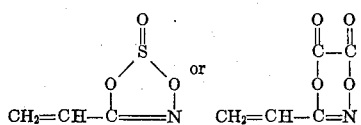

Likewise these vinyl compounds can be copolymerized with one or more polymerizable monomers, for example, olefinically unsaturated hydrocarbons, esters, ethers, aldehydes, ketones, nitriles, amides, halogen compounds, carboxylic acid or anhydride compounds and like monomers which are not nucleophilic compounds, i.e. those free of reactive hydrogen atoms as determined by the Zerewitinoff test, or free of positive metal ions or a positive ammonium ion which would react with the cyclic nitrile group. Examples are the mono- and diolefins such as ethylene, propylene, butadiene, styrene, vinyl ethers, vinyl esters, the acrylates, methacrylates, acrylonitrile, vinyl chloride, maleic anhydride and the like. The production of these high molecular polycylic nitrile adducts is likewise disclosed in U.S. Pat. No. 3,652,507 and U.S. Pat. No. 3,480,595, both of which are incorporated herein by reference.

The polymerization can be catalyzed by conventional polymerization catalysts, particularly of the free-radical type such as the peroxide type compounds, e.g. benzoyl peroxide, the azo compounds, ultra-violet light, and beta or gamma irradiation.

THE POLYOL AND POLYTHIOL COMPOUNDS

The nucleophilic organic compounds are the polyols and polythiols having active hydrogen atoms attached to oxygen or sulfur which can be reacted with the cyclic nitrile adducts. In particular these are the aliphatic, aromatic, polyester, polyether, polylactone, polyols or polythiols and similar compounds having from 2 to 6 or more —OH or —SH groups per molecule and having molecular weights ranging from 62 for ethylene glycol to 75,000 or higher with hydroxyl numbers ranging from 12 to 1,100 or more. Combinations of two or more of these compounds can also be employed.

The aliphatic and aromatic polyhydric alcohols and thiols include, for example, ethylene glycol, diethylene glycol, thiodiethylene glycol, propylene glycol, 1,3-butylene glycol, 1,6-hexanediol, butenediol, butynediol, amylene glycols, 2-methylpentanediol-2,4, 1,7-heptanediol, glycerine, neopentyl glycol, trimethyol propane, triethanol amine, pentaerythritol, cyclohexane dimethanol, sorbitol, mannitol, glactitol, talitol, xylitol, 1,2,5,6-tetrahydroxyhexane, styrene glycol, bis-(β-hydroxyethyl)diphenyl-dimethylmethane, silanediols, e.g. triphenyl silanols, 1,4-dihydroxybenzene and the thiol analogues thereof.

The active hydrogen-containing polymeric compounds useful in this invention include, for instance, polyhydric polyalkylene ethers, hydroxyl polyesters, hydroxyl group containing, preferably hydroxyl-group terminated, polymers, and the thiol analogues thereof. The polyhydric polyalkylene ethers may have a molecular weight greater than about 750 and an hydroxyl number of from about 40 to 150 and may be derived, for example, by the polymerization of alkylene oxides such as ethylene oxide, propylene oxide, butylene oxide and the like. Polyhydric polyalkylene ethers may also be prepared by the polymerization of the cyclic ethers such as, for example, dioxane, tetrahydrofuran and the like, and by the condensation of an alkylene oxide with a glycol, such as ethylene glycol, propylene glycol, butylene glycol and the like.

The hydroxy-containing polyesters may be obtained by the reaction of aliphatic or aromatic dicarboxylic acids with aliphatic or aromatic polyhydric alcohols in the manner well known to the art in proportions that result in esters having at least two reactive hydroxy groups. Any polyhydric alcohols or thiols may be used to form the hydroxy or thiol esters and illustrative of such alcohols are those listed above in the discussion of suitable alcohols as the active hydrogen-containing reactant. Included within the suitable esters are the diglycerides, and hydroxyl-containing castor oil, tall oil, soya oil, linseed oil, etc. The latter esters are usually prepolymers prepared by the reaction of the fatty glyceride with low molecular weight polyols. Illustrative, for instance, of castor oil-based prepolymers are: propylene glycol monoricinoleate, propylene glycol mono-12-hydroxystrearate, neopentyl glycol monoricinoleate, dehydrated castor oil, ethylene glycol minoricinoleate, ethylene glycol mono-12-hydroxystearate, triglyceride or ricinoleic acid, epoxidized castor oil, and pentaerythritol tetraricinoleate. Other suitable polymeric compounds include the hydroxyl- or thiol-terminated olefin polymers such as those of 1,4-butadiene, isoprene, 2,3-dimethylbutadiene, 2-chloro-1,3-butadiene, 2-cyano-1,3-butadiene, and other polymerizable ethylenically unsaturated monomers such as α-olefins of up to 12 carbon atoms such as ethylene, propylene, butene, etc.; styrene, acrylonitrile, acrylic acid or ester, methacrylic acid or ester, vinyl chloride, vinylidine chloride and the like; hydroxyl-terminated condensates of phenol and lower aldehydes and hydroxy-terminated polyepoxides.

THE EPOXIDES

The epoxides which can be employed include the mono- and diepoxides as well as those having a multiplicity of oxirane rings. The monoepoxides are represented by the formula:

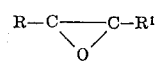

wherein R and $R^1$ may be like or unlike radicals and may be hydrogen, alkyl, cycloalkyl or aromatic radicals. The 1,2-epoxy compounds are preferred, i.e. wherein $R^1$ is hydrogen and R is one of the enumerated radicals. Examples are respectively, propylene oxide, cyclohexene oxide (1,2-epoxycyclohexane), and styrene oxide.

Another important group of epoxides suitable for use in this invention are the diepoxides and polyepoxides including epoxy esters.

The polyepoxides comprise those materials possessing more than one vicinal epoxy group, i.e. more than one

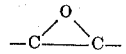

group per molecule. These compounds may be saturated or unsaturated, aliphatic, cycloaliphatic, aromatic or heterocyclic and may be substituted with substituents, such as chlorine, hydroxyl groups, ether radicals and the like. They may be monomeric or polymeric.

For clarity, many of the polyepoxides and particularly those of the polymeric type are described in terms of epoxy equivalent values. The meaning of this expression is well known. It is described, for example, in U.S. Pat. No. 2,633,458 to Shokal. The polyepoxides used in the present invention are those having an epoxy equivalency greater than 1.0.

The polyepoxides used may be of a single type or may be mixtures of several different types or molecular weights. Although some normally solid components may be included, the total mixture is in each case a liquid. For purposes of describing and claiming this invention, normally liquid polyepoxides are those having a Durrans mercury method softening point of up to about 30°C. and normally solid polyepoxides are those which have a higher softening point.

The polyepoxides that are particularly preferred in this invention are the glycidyl ethers and particularly the normally liquid glycidyl ethers of polyhydric phenols or polyhydric alcohols. The glycidyl ethers of polyhydric phenols are obtained by reacting epichlorohydrin with the desired polyhydric phenols in the presence of alkali. Polyether A and polyether B described in Shokal, U.S. Pat. No. 2,633,458, are good examples of polyepoxides of this type. Other examples include the polyglycidyl ether of 1,1,2,3,-tetrakis-(4-hydroxyphenyl)ethane (epoxy value of 0.45 eq./100 g. and melting point 85°C.), polyglycidyl ether of 1,1,5,5-tetrakis(hydroxyphenyl)pentane (epoxy value 0.514 eq./100 g.) and the like and mixtures thereof.

Another useful group of polyepoxides are epoxidized polyethylenically unsaturated hydrocarbons, such as epoxidized 2,2-bis(2-cyclohexenyl)propane, epoxidized vinylcyclohexene and epoxidized dimer of cyclopentadiene.

Another useful group comprises the epoxidized polymers and copolymers of diolefins, such as butadiene. Examples of this include, among others, butadiene-acrylonitrile copolymers (Hycar rubbers), butadiene-styrene copolymers and the like.

Another useful group comprises glycidyl-containing nitrogen compounds, such as diglycidyl aniline and di- and triglycidylamine.

Another useful group includes epoxy esters which are the epoxidized ester of unsaturated monohydric alcohols and polycarboxylic acids having the epoxy group in the terminal position of an open chain portion of the molecule, such as for example:
di(2,3-epoxypropyl)adipate, di(2,3-epoxypropyl)oxalate, di(5,6-epoxyhexyl)succinate, di(3,4-epoxybutyl)maleate, di(7,8-epoxyoctyl)pimelate, di(3,4-epoxybutyl)phthalate, di(2,3-epoxypropyl)tetrahydrophthalate, di(2,3-epoxypropyl)maleate di(4,5-epoxypentyl)thiodipropionate, di(13,14-epoxytetradecyl)diphenyldicarboxylate, di(6,7-epoxyheptyl)sulfonyldibutyrate, tri(2,3-epoxypropyl)1,2,4-butanetricarboxylate, di(4,5-epoxypentyl)tartarate, di(2,3-epoxypropyl)azelate, di(2,3-epoxypropyl)citrate, di(2,3-epoxypropyl)cylcohexane-1,3-dicarboxylate, di(17,18-epoxyoctadecyl)malonate.

Further esters of this type are those described in U.S. Pat. No. 2,895,947 to Shokal et al., namely, esters of epoxy substituted monohydric alcohols and acid components of the group consisting of aromatic polycarboxylic acids and acid esters of these acids and polyhydric compounds wherein at least two of the carboxyl groups of the acid components are esterified with the epoxy alcohol. Preferred esters of this type are di(2,3-epoxypropyl)terephthalate, di(2,3-epoxypropyl)-chloroterephthalate, di(3,4-epoxyhexyl)isophthalate, di(3,4-epoxycyclohexyl)orthophthalate, di(epoxypropoxyethyl)-2-methyl-terephthalate and the like.

Another group of suitable epoxy esters includes epoxidized esters of unsaturated alcohols and unsaturated carboxylic acids, such as 2,3-epoxybutyl-3,4-epoxypentanoate, 3,4-epoxycyclohexanoate, 3,4-epoxycyclohexyl-4,5-epoxyoctanoate, 2,3-epoxycyclohexylmethylepoxymethylcyclohexanecarboxylate.

Still another group of suitable epoxy esters includes epoxidized derivatives of polyethylenically unsaturated polycarboxylic acids such as, for example, dimethyl-8,9,12,13-diepoxyeicosanedioate, dibutyl-7,8,11,12-diepoxyoctadecanedioate, dioctyl-10,11,diethyl-8,9,12,13-diepoxyeicosandioate, dihexyl-6,7,10,11-diepoxyhexadecanedioate, didecyl-9-epoxyethyl-10,11-epoxyoctadecanedioate, dibutyl-3-butyl-3,4,5,6-diepoxycyclohexane-1,2-dicarboxylate, dicyclohexyl-3,4,5,6-diepoxycyclohexane-1,2-dicarboxylate, dibenzyl-1,2,4,5-diepoxycyclohexane-1,2-dicarboxylate, and diethyl-5,6,10,11-diepoxyoctadecyl succinate.

Still another group of epoxy esters comprises the epoxidized polyesters obtained by reacting a polyhydric alcohol and polycarboxylic acid or anhydride in which either one or both compounds are unsaturated, such as, for example, the polyester obtained by reacting 8,9,12,13-eicosadienedioic acid with ethylene glycol, the polyester obtained by reacting diethylene glycol with 2-cyclohexene-1,4-dicarboxylic acid and the like, and mixtures thereof.

The foregoing examples of epoxides are merely illustrative of the vast number of epoxides which can be used to produce the novel compounds of this invention by the methods of this invention. Thus any compound having one or more oxirane rings can be used in the present invention.

THE CATALYSTS

The compounds which can be utilized to catalyze the reaction of the cyclic nitrile adduct with the epoxide and, if desired, with the polyol or polythiol include the tertiary amines. The examples of these base catalysts are: pyridine, dimethyl aniline, triethylamine, trimethylamine, tri-n-propylamine, tri-n-butylamine, N-methylpiperidine, N-allyl-piperidine and the like. A particularly preferred amine is triethylene diamine.

The reaction is also catalyzed by contacting the reactants with catalytically-effective amounts of the combination of:

I. a first metal or a mixture of metals selected from the metals of Groups III through V of the Periodic Table, and II. a second metal or a mixture of metals selected from the metals of Groups I and II and the iron series of Group VIII of the Periodic Table.

The two metals are supplied to the catalyst combination as one or more compounds which are sufficiently soluble in the reaction mixture to allow for the metals to be dissolved in the reaction mixture in catalytically-effective amounts. Thus, the metals are not suitably employed in their insoluble elemental state in the catalyst combination. Preferably, there will be present in the catalyst combination about 0.2 to 4 molar equivalents of the first metal, i.e. the Groups III – V metal, per molar equivalent of the second metal, i.e. the Groups I, II or iron series metal. These catalysts are described in greater detail in U.S. Pat. No. 3,652,507 and incorporated herein by reference.

A second series of similar metal catalysts consists of a compound of aluminum, tin, titanium, zinc, bismuth or iron which is soluble in the reaction mixture provided that the metal is in a valence state other than zero, further provided that when the metal is aluminum, tin, titanium or bismuth there is an absence of metal from Groups I, II or the iron series of Group VIII of the Periodic Table, and when the metal is zinc or iron the reaction is conducted in the absence of metals in groups III to V of the Period Table. These catalysts are more fully described in U.S. Pat. No. 3,702,320 which patent is incorporated herein by reference.

Combinations of the aforementioned tertiary amine type catalysts with any one or combinations of the aforementioned metal compound type catalysts also can be employed and in general are preferred.

The transition organometallic compounds which have been found to be particularly suitable are: stannous octoate, dibutyltin dilaurate, zinc octoate and aluminum isopropoxide.

It also has been found that when the cyclic nitrile adduct-epoxide-polyol or polythiol system is being reacted that the epoxide accelerates the reaction between the hydroxyl or thiol group and the cyclic nitrile group.

SOLVENTS

The solvents that are useful in this invention are those commonly employed in coating, film forming, or adhesive technology such as anhydrous ethyl acetate, butyl acetate, methyl ethyl ketone, methyl isobutyl ketone, xylene toluene, benzene, cellosolve acetate (2-ethoxyethyl acetate) and the like.

REACTION CONDITIONS

When producing coatings and films the curing temperature may range from 60° C. to 200° C. A preferred range to initiate cure is 60° C. to 150° C. with 120° C. being the preferred temperature of initiation. The initiation temperature may be the cure temperature, or it may be desired to initiate the cure then raise the temperature to effect complete cure in a shorter period of time.

There is no preferred curing time since curing time depends upon the catalyst, cure temperature, equivalent ratio of the reactants and the physical properties sought. In general, however, times ranging from 5 minutes to one hour are satisfactory.

When elastomers are desired any of the diols commonly employed in the manufacture of urethane elastomers such as ethylene glycol, propylene glycol, 1,4-butanediol polytetramethylene ethers and 1,4-butanediol adipate polyesters can be used in this invention.

Other conditions for elastomer production are set forth in the examples.

When it is desired to produce foams, a surfactant is added to the other reactants. Typical materials which can be used are: silicone-glycol copolymers, polydimethylsiloxanes, polydimethylsiloxane polyoxyalkylene copolymers, polyoxyethylated vegetable oil and the like.

The following examples are provided to further illustrate the invention wherein adipodinitrile carbonate is employed as a typical cyclic nitrile in reaction with typical epoxy compounds either with or without polyols or polythiols.

As has been stated the adipodinitrile carbonate contains two reactive functional groups per molecule and thus can react with 1 molecule of an epoxide having 2 epoxy groups per molecule or with 2 molecules of a monoepoxide, likewise 2 molecules of adipodinitrile carbonate react with 1 molecule of a polyol having 4 hydroxyl groups per molecule. Accordingly, in the examples which follow although the weight of the adipodinitrile carbonate, epoxide compound, and polyol used may vary the equivalents are stated in most instances.

When preparing coating compositions it is preferred to combine the adipodinitrile carbonate, the epoxide, the polyol (if used) and the solvent, preferably Cellosolve Acetate, with the solids being in their desired proportions and in an amount such that a 50 weight per cent amount of solid in the solvent is produced. The mixture is heated gently to 60° C. – 65° C. for from 10 to 30 minutes until a clear solution is obtained thereafter the solution is cooled to room temperature before adding the catalyst. The total amount of catalyst can range from 0.5 to 1 per cent of the weight of the solids, although this is merely a convenient amount, and smaller or larger amounts can be used. Too small amounts of course extend the curing time unduly while too large amounts may not give desired time for a proper cure. After the catalyst has been added, films from these formulations were cast on degreased cold rolled steel panels and cured to completion, generally 30 minutes at 130° C., although this time can be varied with variations in the formulations as will be shown.

EXAMPLE I

To a suitable container were added 30.26 grams of Cellosolve Acetate, 11.41 grams of adipodinitrile carbonate and 18.85 grams of bisphenol diglycidyl ether (tradename Epon 828, epoxy equivalent weight 185 – 192). The equivalents ratio of adipodinitrile carbonate to the epoxide as 1:1. Four such solutions were made and a different catalyst was added to each. These were:
1. Stannous octoate —g. 0.15 g.
   triethylenediamine — 0.15 g.g
2. dibutyltin dilaurate — 0.15 g.
   triethylenediamine — 0.15 g.
3. zinc octoate — 0.15 g.
   triethylenediamine — 0.15
4. triethylenediamine — 0.30 g.

After these films were cast on cold rolled steel panels and baked for 30 minutes at 130° C. they were tested for pencil hardness, with catalyst (1), (2), and (3) the pencil hardness in each case was HB, while with catalyst (4) the pencil hardness was 5B.

EXAMPLE II

A second series of coatings were made employing a polyol in conjunction with the adipodinitrile carbonate and bisphenol diglycidyl ether used in Example I. This poly phenol was a polypropylene ether glycol of pentaerythrithol (tradename PEP 450) having a typical hydroxyl number of 560 and had an average of 4 hydroxyl groups per molecule. The amounts of the adipodinitrile carbonate, epoxide and polyol were selected to give the equivalents ratio of 1:1:1. To a suitable container were added 25.90 grams of Cellosolve Acetate, 11.40 grams of adipodinitrile carbonate, 9.43 grams of the epoxide and 5.08 grams of the polyol. To six such formulations after dissolving, various catalysts were added as in Example I and the films were cast on the steel panel and baked at 130° C. as in Example I. The catalyst employed were:

5. dibutyltin dilaurate — 0.13 g.
   triethylenediamine — 0.13 g.
6. stannous octoate — 0.13 g.
   triethylenediamine — 0.13 g.
7. zinc octoate — 0.13 g.
   triethylenediamine — 0.13 g.
8. aluminum isopropoxide — 0.13 g.
   triethylenediamine — 0.13 g.
9. zinc octoate — 0.26 g.
10. triethylenediamine — 0.26 g.

The pencil hardness were respectively (5) 2H, (6) 2H-3H, (7) 2H-3H, (8) H-2H, (9) 2B and (10) HB. It will be seen that somewhat harder coatings were obtained than in Example I.

EXAMPLE III

Two non-polyol-containing formulations were made, with adipodinitrile carbonate and the bisphenol diglycidyl ether used in Example I. The ingredients were combined at room temperature with sufficient dry Cellosolve Acetate to make a 50 per cent by weight of the solids. The combination was heated at 65° C. for 30 minutes to insure complete solution. After cooling the catalyst was added which consisted of 50 weight per cent stannous octoate and 50 weight per cent triethylenediamine in an amount which was 1 per cent by weight of the two solids. Films from these formulations were cast on the degreased steel panels and cured to completion in 30 minutes at 130° C. The properties of the resulting coatings were as follows:

TABLE I

| Wt % | | |
|---|---|---|
| ADNC[a] | 37.7 | 54.6 |
| Epon 828[b] | 62.3 | 45.4 |
| Physical Properties | | |
| Hardness | | |
|  Sword | 14 | 40 |
|  Pencil | F-H | 4H-6H |
| Gardner Impact, in. lbs. | | |
|  Direct | <60 | <60 |
|  Reverse | <60 | <60 |
| Color | light yellow | light yellow |

[a] ADNC is adipodinitrile carbonate
[b] Epon 828 is the bisphenol diglycidyl ether of Example I.

It will be seen that the higher ratio of adipodinitrile carbonate gives a harder film.

EXAMPLE IV

Four formulations were made containing the same ingredients as Example II. The equivalents are shown in Table II. The total amount of these as solids (actives) in each formulation amounted to 50 parts by weight. These were dissolved in sufficient Cellosolve Acetate to give a 50 weight per cent solution. The actives and solvent were heated to 60° C. and maintained at that temperature until a clear solution was obtained. After cooling the catalyst was added which consisted of 0.25 parts by weight of dibutyltin dilaurate and 0.25 parts by weight of triethylenediamine, i.e. the catalyst was 0.5 weight per cent of the weight of the total actives. Each formulation was cast on a steel panel and cured at 130° C. until a tack-free film was obtained. The number of minutes to obtain such tackfree film is also shown in Table II together with the physical properties of the films.

TABLE II

| Composition No. | 1 | 2 | 3 | 4 |
|---|---|---|---|---|
| Equivalents | | | | |
|  ADNC | 1 | 1 | 1 | 1 |
|  Epon 828 | 0.05 | 0.25 | 0.5 | 0.75 |
|  PEP 450 | 0.95 | 0.75 | 0.5 | 0.25 |
| mins. at 130° C. | 25 | 10 | 5.5 | 30 |
| Physical Properties | | | | |
| Hardness | | | | |
|  Sword | 38-44 | 46-56 | 40-46 | — |
|  Pencil | 4H-6H | 6H-7H | 5H-7H | H-2H |
| Gardner Impact, In. lbs. | | | | |
|  Direct | >160 | 160 | 60 | <40 |
|  Reverse | >160 | 160 | 60 | 40-60 |
| Mandrel Bend | | | | |
|  ⅛ inch | Pass | Pass | Pass | Fail |
|  ¼ inch | Pass | Pass | Pass | Pass |
| Taber Abrasion, mg. loss Per 1,000 cycles, CS-10 wheels, 1,000 gm. load. | 50 | 56 | 78 | 110 |

These data show that the range of 0.25 equivalents of the epoxide, i.e. bisphenol diglycidyl ether, gives the best combination of a short bake cycle, impact strength, mandrel bend, taber abrasion resistance and pencil hardness. The color of the baked film becomes yellowish when as much as 0.75 equivalents of the epoxides were employed.

EXAMPLE V

Formulations were made containing respectively, (1) adipodinitrile carbonate, vinylcyclohexene diepoxide and PEP 450 (see Example II) with the equivalents being 1/0.5/0.5 respectively, (2) adipodinitrile carbonate, 1,2,7,8-diepoxy octane, PEP 450 with equivalents being 1/0.25/0.75, (3) adipodinitrile carbonate, $C_{10} - C_{13}$ alphaolefin oxide, PEP 450 with the equivalents being 1/0.25/0.75. In each formulation a 50 per cent solution Cellosolve Acetate was made and a 50/50 weight per cent mixture of dibutyltin dilaurate and triethylenediamine was employed as the catalyst in an amount of 0.5 weight per cent of the total actives in solution. For formulation number (1) using the vinylcyclohexene diepoxide 30 minutes at 130° C. were required to produce a tack-free film on a steel panel, with formulation number (2) 23 minutes were required and for formulation number (3) 50 minutes were required. These data show, however, that the epoxy compounds accelerate curing time and formulations with the vinylcyclohexene diepoxide were found to give a pencil hardness of 2H.

EXAMPLE VI

In order to show the use of other diols a composition was made in the usual manner using 1 equivalent adipodinitrile carbonate, 0.95 equivalents bispropyleneglycol isophthalate, and 0.05 equivalents of the Epon 828. The usual solution of 50 per cent actives in Cellosolve Acetate solvent was prepared and after cooling 1 per cent by weight based on the actives of triethylenediamine and stannous octoate in a 50:50 weight ratio was added as the catalyst. Coatings of 2 mil dry thickness on degreased mild steel panels were made by baking for 30 minutes at 130° C. The coatings had a pencil hardness of FH, sward hardness of 37 and a Gardner impact (in. lbs.) of 40 – 60, both direct and reverse, thus showing, as in Example VI that polyols having fewer than 4 hydroxyl groups per molecule can be employed in the method of this invention.

In all of the foregoing examples the films were cast to a thickness of 2 mils when cured, however, films having thicknesses of 0.55 mils and 1 mil have also been produced successfully by the method of this invention.

EXAMPLE VII

In order to demonstrate that the method of this invention can be employed to produce elastomers, a run was carried out wherein a polyester described as hydroxy-terminated 1,4-butanediol adipate of molecular weight 1000 and a hydroxyl number of 110.4 (tradename Formrez 13–35) in an amount of 30.00 grams was charged to a 100 ml resin kettle. The resin was degassed at 100° C. at 15 mm Hg. for ½ hour. The system was opened to nitrogen and cooled. Triethylenediamine, 0.18 grams, Epon 828 0.18 grams, and dibutyltin dilaurate, 0.18 grams were added to the degreased polyol. The mixture was reheated to 100° C. under a nitrogen atomsphere. Adipodinitrile carbonate, 6.7282 grams was added slowly to the mixture, a vigorous reaction ensued and enough dioxane, 36 grams, was added to maintain a fluid mixture. After the addition of the adipodinitrile carbonate was complete the mixture was stirred for 4 hours. After this heating point the dioxane was removed under reduced pressure and the mixture was heated for 2 hours at 100° C. and 15 mm Hg. The final production was tough elastomeric mass.

In order to produce elastomers it is necessary to use an amount of adipodinitrile carbonate such that exactly a 1:1 ratio of hydroxyl and epoxy to carbonate ratio is maintained. Low molecular weight oils or wax-like compounds are produced if this ratio is not maintained. Exact stoichiometry, hydroxy-epoxy to carbonate ratio must be maintained to produce an elastomeric product. Thus the exact hydroxyl content and epoxide (oxirane) group content, if not given by the manufacturer of the polyol and the epoxide, must be determined analytically.

The following examples describe the production of foams utilizing the adipodinitrile carbonate as the typical cyclic nitrile adduct and Epon 828 as the typical epoxide.

EXAMPLE VIII

Flexible urethane foams can be made by the method of this invention by various procedures. In one procedure the polyol, epoxide, surfactant, and catalyst mixture is charged to a suitable vessel and heated for from 2 to 5 minutes in an oil bath at 90° C. The adipodinitrile carbonate is then added and the mixture allowed to heat 2 to 5 minutes before stirring. The mixture is stirred with a high speed motor, for example, about 4,000 r.p.m. for 30 seconds and is then transferred rapidly to a container immersed in an oil bath at a temperature of from 100° C. to 110° C. It is preferred to heat the upper surface of the rising foam with an infrared lamp placed about 10 inches above the container. After the foaming is completed the foam product is heated an additional 10 minutes.

A typical formulation utilized in making such foams employs as the polyol a 3000 molecular weight triol made from propylene oxide and ethylene oxide, hydroxyl number 58.2 sold under the tradename LC-60, a typical epoxide such as Epon 828 and surfactant such as a silicone surfactant sold under the tradename L-520. The catalyst is a mixture of triethylenediamine, dibutyltin dilaurate and aluminum isopropoxide. When using these ingredients the equivalents are adipodinitrile carbonate 1.1, LC-60 0.9, and Epon 828 0.1. In parts by weight, the formulation is:

| | Parts |
|---|---|
| ADNC | 12 |
| LC-60 | 86 |
| Epon 828 | 1.81 |
| Aluminum Isopropoxide | .86 |
| Silicone L-520 | .5 |
| Triethylenediamine | .45 |
| Dibutyltin dilaurate | 1.8 |

EXAMPLE IX

In a second procedure the adipodinitrile carbonate LC-60, Epon 828, and aluminum isopropoxide of Example IX are combined to form a prepolymer by mixing at 100° C. for 30 minutes with nitrogen bubbling through the prepolymer during its preparation. The silicone L-520 is added followed by the dibutyltin dilaurate and the composition is mixed for 1 minute. The triethylenediamine is then added and the composition mixed for 30 seconds. The foam is allowed to rise in a container maintained at 100° C. for 10 minutes. It has been found in this method that the amount of triethylenediamine is rather critical since 0.3 parts by weight is inadequate. It has also been found that scorching and cell collapse occurs under the infra-red lamp when heat curing is extended beyond about 10 minutes. Lowering the temperature of the mix to 90° C. does not improve the foam but instead promotes the formation of blow holes.

The foregoing examples demonstrate that highly useful products are obtained by catalytically condensing an epoxide compound with a cyclic nitrile adduct, and that additional useful compounds can be made by condensing polyhydroxy compounds with the adduct and the epoxide compound.

We claim:

1. A method of preparing urethane or thiourethane compounds by catalytically condensing a vicinal epoxide compound with a cyclic nitrile adduct having the structure:

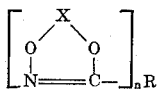

wherein R is an organic radical having from 2 to about 200,000 carbon atoms, and is free of reactive hydrogen atoms as determined by the Zerewitinoff test X is:

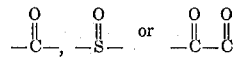

and $n$ ranges from 2 to about 100,000 in the presence of a catalyst selected from the group consisting of
 a. a tertiary amine,
 b. a first metal or mixture of metals selected from Groups III through V of the Periodic Table and a second metal or mixture selected from the metals of Groups I and II and the Iron series of Group VIII of the Periodic Table,
 c. a compound of aluminum, tin, titanium, zinc, bismuth or iron which is soluble in the reaction mixture provided that the metal is in a valence state other than zero, further provided that when the metal is aluminum, tin, titanium or bismuth there is an absence of metal from Groups I, II or the iron series of Group VIII of the Periodic Table, and when the metal is zinc or iron the reaction is conducted in the absence of metals in groups III to V of the Periodic Table, and
 d. mixtures of (a) with (b) or (c).

2. The method according to claim 1, wherein said cyclic nitrile adduct is a cyclic nitrile carbonate.

3. The method according to claim 2, wherein said cyclic nitrile carbonate is adipodinitrile carbonate.

4. The method according to claim 1, wherein said catalytic condensation is carried out together with a polyhydroxyl containing compound.

5. The method according to claim 1, wherein said vicinal epoxide is a diepoxide.

6. The method according to claim 5, wherein said diepoxide is bisphenol diglycidyl ether.

7. The method according to claim 4, wherein said polyhydroxyl compound is a polypropylene ether glycol of pentaerythritol.

8. The method according to claim 1, wherein said condensation is carried out at a temperature of from 60° C. to 200° C. for a time sufficient to produce a tack-free film.

9. The method according to claim 1, wherein said cyclic nitrile adduct is adipodinitrile carbonate and is condensed with a vicinal epoxy compound and a polyol with the amount of adipodinitrile carbonate being such that an exact 1:1 stoichiometric ratio of carbonate to hydroxyl and vicinal epoxy groups is maintained to produce an elastomeric compound.

10. The method according to claim 1, wherein a surfactant is added to said condensation reaction to produce a polyurethane foam.

11. The compounds made in accordance with the method of claim 1.

12. The film compounds made in accordance with the method of claim 8.

13. The elastomeric compounds made in accordance with the method of claim 9.

14. The foam compounds made in accordance with the method of claim 10.

* * * * *